US012740574B2

(12) United States Patent
Nakano et al.

(10) Patent No.: US 12,740,574 B2
(45) Date of Patent: Sep. 22, 2026

(54) METHOD FOR PRODUCING SKIM MILK POWDER

(71) Applicant: KABUSHIKI KAISHA YAKULT HONSHA, Minato-ku (JP)

(72) Inventors: Masatoshi Nakano, Minato-ku (JP); Daichi Nihei, Minato-ku (JP); Yohei Takahashi, Kitahiroshima (JP); Shotaro Morita, Kitahiroshima (JP)

(73) Assignee: KABUSHIKI KAISHA YAKULT HONSHA, Minato-ku (JP)

( * ) Notice: Subject to any disclaimer, the term of this patent is extended or adjusted under 35 U.S.C. 154(b) by 0 days.

(21) Appl. No.: 17/275,895

(22) PCT Filed: Sep. 27, 2019

(86) PCT No.: PCT/JP2019/038260
§ 371 (c)(1),
(2) Date: Mar. 12, 2021

(87) PCT Pub. No.: WO2020/067474
PCT Pub. Date: Apr. 2, 2020

(65) Prior Publication Data

US 2021/0259265 A1 Aug. 26, 2021

(30) Foreign Application Priority Data

Sep. 28, 2018 (JP) ................................ 2018-185392

(51) Int. Cl.
*A23C 9/14* (2006.01)
*A23C 1/04* (2006.01)

(52) U.S. Cl.
CPC . *A23C 9/14* (2013.01); *A23C 1/04* (2013.01)

(58) Field of Classification Search
CPC .... A23C 9/14; A23C 1/04; A23C 9/18; A23C 3/02; A23C 3/12; A23C 2210/254; A23C 13/12
USPC ........................................ 426/580, 588, 519
See application file for complete search history.

(56) References Cited

U.S. PATENT DOCUMENTS

| | | | | |
|---|---|---|---|---|
| 5,401,523 | A | 3/1995 | Degen et al. | |
| 6,326,044 | B1 * | 12/2001 | Lindquist | A23C 9/1422 210/651 |
| 2004/0170722 | A1 | 9/2004 | Kloek et al. | |
| 2009/0285934 | A1 * | 11/2009 | Nielsen | A23C 9/1216 426/35 |
| 2017/0367362 | A1 * | 12/2017 | Kreuss | A23C 1/12 |

FOREIGN PATENT DOCUMENTS

| | | | |
|---|---|---|---|
| EP | 0 316 938 | A2 | 5/1989 |
| EP | 1 563 741 | A1 | 8/2005 |
| JP | 1-187049 | A | 7/1989 |
| JP | 6-62695 | A | 3/1994 |
| JP | 2002-345402 | A | 12/2002 |
| JP | 2004-520851 | A | 7/2004 |
| JP | 2008-29278 | A | 2/2008 |
| JP | 2014-221033 | A | 11/2014 |
| JP | 2016-1999 | A | 1/2016 |
| WO | WO 2018/091409 | A1 | 5/2018 |

OTHER PUBLICATIONS

Potter, N., Food Science, Third Edition, 1978, AVI Publishing Co., p. 388.*

Gould, I. A., and Trout, G. M., "The Effect of Homogenization on Some of the Characteristics of Milk Fat," Journal of Agricultural Research, vol. 52, No. 1, Jan. 1, 1936 (Year: 1936).*

Brodziak, A., Krol, J., Litwinczuk, Z., Zaborska, A., and Czernecki, T., "Effect of storage time under home refrigeration conditions on the quality of opened drinking milk," Mljekarstvo, 67 (4), 283-296 (2017) (Year: 2017).*

Gould, I. A., and Trout, G. M., âThe Effect of Homogenization on Some of the Characteristics of Milk Fat,â Journal of Agricultural Research, vol. 52, No. 1, Jan. 1, 1936 (Year: 1936).*

Brodziak, A., Krol, J., Litwinczuk, Z., Zaborska, A., and Czernecki, T., âEffect of storage time under home refrigeration conditions on the quality of opened drinking milk,â Mljekarstvo, 67 (4), 283-296 (2017) (Year: 2017).*

International Search Report issued on Dec. 10, 2019 in PCT/JP2019/038260 filed on Sep. 27, 2019, 3 pages.

Deeth et al., "Some factors involved in milk lipase activation by agitation", Journal of Daily Research, 1977, vol. 44, pp. 569-583 (17 total pages).

Bhavadasan et al., "Influence of Agitation on Milk Lipolysis and Release of Membrane-Bound Xanthine Oxidase", J Dairy Sci, 1982, vol. 65, pp. 11692-11695.

Kim et al., "Surface composition of industrial spray-dried milk powders. 2. Effects of spray drying conditions on the surface composition", Journal of Food Engineering, 2009, vol. 94, pp. 169-181.

Mercan et al., "Determination of powder flow properties of skim milk powder produced from high-pressure homogenization treated milk concentrates during storage", LWT—Food Science and Technology, 2018, vol. 97, pp. 279-288.

Haiya et al., "Effect of Treatment with a Blender-Type Homogenizer on Lipolysis in Raw and Heated Milk Samples", Memoirs of the Faculty of Agriculture, Hokkaido University, 1989, vol. 16, No. 3, pp. 282-286 (6 total pages).

(Continued)

*Primary Examiner* — Jeffrey P Mornhinweg

(74) *Attorney, Agent, or Firm* — Oblon, McClelland, Maier & Neustadt, L.L.P.

(57) ABSTRACT

Provided is a method for producing skim milk powder in which the amount of free fatty acids has been increased without bringing about deterioration of flavor. The method for producing skim milk powder comprises a step of carrying out homogenization treatment under temperature conditions of 30 to 55° C. in a process of producing the skim milk powder from skim milk.

19 Claims, No Drawings

(56) References Cited

OTHER PUBLICATIONS

Sasaki et al., "Studies on the Effect of Homogenization on the Properties of Milk Casein", Nippon Nogeikagaku Kaishi, 1957, vol. 32, No. 10, pp. 752-756.
Zapico et al., "The effect of homogenization of whole milk, skim milk and milk fat on nisin activity against *Listeria innocua*", International Journal of Food Microbiology, 1999, vol. 46, pp. 151-157.
Liu et al., "Modeling the effect on skim milk during ultra-high pressure homogenization using front-face fluorescence", Innovative Food Science and Emerging Technologies, 2018, vol. 47, pp. 439-444.

* cited by examiner

METHOD FOR PRODUCING SKIM MILK POWDER

TECHNICAL FIELD

The present invention relates to a method for producing skim milk powder which is suitable as a raw material for fermented milk.

BACKGROUND ART

Fermented milk which is one of food utilizing lactic acid bacteria contains live lactic acid bacteria, and as a raw material for the fermented milk, animal milk such as cow milk or skim milk powder prepared from such animal milk is sometimes used. Therefore, skim milk powder having better fermentability of lactic acid bacteria is desired.

Milk fat which is a fat component in cow milk is composed of many different fatty acids. Most of them are saturated fatty acids, and it is known that short-chain, medium-chain and long-chain fatty acids are widely contained, and particularly, long-chain fatty acids having 14 to 18 carbon atoms, such as palmitic acid, myristic acid, stearic acid and oleic acid, are contained in large amounts. Milk fat in raw milk is dispersed in the form of large and small spherical particles (fat globules) each of which is covered with a fat globule membrane composed of phospholipid, and when the fat globule membrane is damaged by an external factor such as agitation, lipase in the raw milk acts to hydrolyze a part of the fat, and thereby, the constituent fatty acids are released (Non Patent Literatures 1 and 2).

Such free fatty acids become a problem in product management because they often provide unpleasant odor or taste, but on the other hand, it has been confirmed that the fermentability of lactic acid bacteria is enhanced by the increase in the amount of the free fatty acids.

Since skim milk powder is a substance obtained by removing cream (milk fat component) from raw milk and then removing almost all the moisture content, the fatty acid content in skim milk powder is much lower than that in raw milk. Therefore, in order to use skim milk powder as a raw material for fermented milk, it is desired to increase the free fatty acid content.

CITATION LIST

Non Patent Literature

Non Patent Literature 1: DEETH, H. C. and FITS-GERALD, C. H.: Some factors involved in milk lipase activation by agitation, J. Dairy Res., 44: 569-583, 1977

Non Patent Literature 2: BHAVADASON, M. K., ABRAHAM, M. j. and GANGUL, N. C.: Influence of agitation on milk lipolysis and release of membrane-bound xanthine oxidase, J. Dairy Sci., 65: 1692-1695, 1982

SUMMARY OF INVENTION

Problem to be Solved by the Invention

The present invention relates to providing a method for producing skim milk powder in which the amount of free fatty acids has been increased without bringing about deterioration of flavor.

Means for Solving the Problem

The present inventors have found that by subjecting skim milk to homogenization treatment under the specific temperature conditions in the process of producing skim milk powder, the amount of free fatty acids increases, and deterioration of flavor is not brought about.

That is, the present invention relates to the following 1) to 11).

1) A method for producing skim milk powder, comprising a step of carrying out homogenization treatment under temperature conditions of 30 to 55° C. in a process of producing the skim milk powder from skim milk.

2) The method according to 1), wherein the homogenization treatment is carried out at 43 to 53° C. 3) The method according to 1) or 2), wherein the homogenization treatment is carried out at a homogenization pressure of 5 to 50 MPa using a homogenizer.

4) The method according to any one of 1) to 3), wherein an amount of free fatty acids in the skim milk powder increases.

5) The method according to 4), wherein an amount of free fatty acids having 14 or more carbon atoms measured after the skim milk is stored at 10° C. or lower for 24 hours after the homogenization treatment increases by 20% or more as compared with the amount thereof measured after the skim milk is stored for 24 hours without carrying out the homogenization treatment.

6) The method according to 4) or 5), wherein a percentage of increase of fatty acids having 12 or less carbon atoms measured after the skim milk is stored at 10° C. or lower for 24 hours after the homogenization treatment is lower than a percentage of increase of the fatty acids having 14 or more carbon atoms.

7) The method according to any one of 4) to 6), wherein the amount of the free fatty acids having 14 or more carbon atoms measured after the skim milk is stored at 10° C. or lower for 24 hours after the homogenization treatment is 300% or more of the amount of the free fatty acids having 12 or less carbon atoms.

8) Skim milk powder produced by the method according to any one of 1) to 7).

9) A method for increasing an amount of free fatty acids in skim milk powder, comprising carrying out homogenization treatment under temperature conditions of 30 to 55° C. in a process of producing the skim milk powder from skim milk.

10) The method according to 9), wherein an amount of free fatty acids having 14 or more carbon atoms measured after the skim milk is stored at 10° C. or lower for 24 hours after the homogenization treatment increases by 20% or more as compared with the amount thereof measured after the skim milk is stored for 24 hours without carrying out the homogenization treatment.

11) The method according to claim 9 or 10, wherein a percentage of increase of fatty acids having 12 or less carbon atoms is lower than a percentage of increase of the fatty acids having 14 or more carbon atoms.

Advantageous Effect of Invention

According to the method of the present invention, skim milk powder in which the content of free fatty acids has been increased without bringing about deterioration of flavor can be obtained.

MODE FOR CARRYING OUT THE INVENTION

In the present invention, the “skim milk powder” refers to a powdered substance obtained by subjecting skim milk obtained by removing a cream component from raw milk to sterilization, concentration and drying treatment.

The raw milk used as a raw material may be any of cow milk, goat milk, sheep milk, buffalo milk, horse milk, camel milk, and the like, and the properties of the raw milk are not particularly limited as long as the properties are those usually known in the milk processing industry.

In the method for removing the cream component (also referred to as "cream separation") to obtain skim milk, the type of a separator, the operation conditions, etc. are not particularly limited, and the method may be a continuous treatment method, or may be a batch treatment method. The method is preferably a separation method which is carried out at 10 to 65° C. using a cream separator.

The method for producing skim milk powder of the present invention comprises a step of subjecting skim milk to homogenization treatment under temperature conditions of 30 to 55° C. in a process of producing the skim milk powder from skim milk.

The process of producing the skim milk powder from skim milk includes steps of sterilization, concentration and powdering by drying generally carried out for producing skim milk powder, the steps being carried out on the skim milk in this order.

The means of the homogenization treatment is not limited as long as the whole of the skim milk can be mixed and stirred, but a means using a homogenizer is preferable, and in this treatment, the homogenization pressure is 5 to 50 MPa (50.986 to 509.86 $kgf/cm^2$), preferably 8 to 30 MPa, and more preferably 12 to 24 MPa.

The homogenization treatment is carried out under the temperature conditions of 30 to 55° C. By homogenizing the skim milk under such temperature conditions, the amount of free fatty acids increases.

The homogenization temperature only needs to be 30 to 55° C., but is preferably 35 to 50° C., more preferably 43 to 53° C., and even more preferably 45 to 51° C.

The temperature control may be carried out by any method of tank type, tubular type, plate type, direct steam type and other type methods.

The homogenization treatment is carried out at least before the sterilization step in which lipase is inactivated, and from the viewpoint of increasing the free fatty acid content, it is preferable that after the homogenization treatment, the treated skim milk be stored for a certain period of time. Here, the skim milk storage time is preferably 12 to 96 hours, and more preferably 24 to 48 hours. The storage of the skim milk is preferably carried out at a temperature of 10° C. or lower. In addition, from the viewpoint of controlling the amount of the free fatty acids, it is possible to add a step of heating and holding the skim milk at 50 to 60° C. for about 20 to 60 minutes before the skim milk storage depending on the fat content in the skim milk.

The sterilization treatment can be carried out under the heating conditions generally adopted in the production of skim milk powder, and for example, this treatment is carried out at 80 to 130° C. for 1 to 30 seconds in a sterilizer.

The apparatus for the heat treatment is not particularly limited as long as the apparatus can adopt the aforesaid heating conditions as a sterilizer, and the apparatus may be any of batch type, tubular type, plate type, direct steam type and other type, but preferably used is a plate type sterilizer or a direct steam type sterilizer, which can carry out control of the above heating conditions stably and easily, has good production efficiency and is capable of mass production.

In the concentration step, the skim milk is vacuum concentrated up to a solid concentration of 40 to 50% at a temperature of 50 to 90° C. by using, for example, an MVR vapor compression concentration apparatus or a vacuum concentration apparatus.

The resulting concentrated liquid is preheated to 50 to 80° C. and then spray dried in a chamber, whereby skim milk powder can be obtained.

In the skim milk powder thus obtained, the content of free fatty acids has increased as compared with that in a usual skim milk powder which has not been subjected to prescribed homogenization treatment. In this case, the content of long-chain fatty acids having 14 or more carbon atoms has increased more than that of fatty acids having 12 or less carbon atoms which are thought to be the cause of deterioration of flavor. Accordingly, even in the case where the content of free fatty acids increases, deterioration of flavor is hardly observed, but rather mellowness and richness due to fatty acids increase, and flavor is improved.

That is, the total amount of the free fatty acids in the skim milk powder of the present invention is preferably 0.02 to 0.15 mass %, and more preferably 0.04 to 0.08 mass %. The amount of the free fatty acids having 14 or more carbon atoms measured after the skim milk is stored at 10° C. or lower for 24 hours after the homogenization treatment is preferably 300% or more, and more preferably 400% or more, in terms of a content, as compared with the amount of the free fatty acids having 12 or less carbon atoms. Here, the upper limit is not particularly limited, but 600% or less or 450% or less may be mentioned.

Moreover, the amount of the free fatty acids having 14 or more carbon atoms measured after the skim milk is stored at 10° C. or lower for 24 hours after the homogenization treatment preferably increases by 20% or more, and more preferably by 40% or more, as compared with the amount thereof measured after the skim milk is stored at 10° C. or lower for 24 hours without carrying out the homogenization treatment. Here, the upper limit is not particularly limited, but 110% or less, 85% or less, 50% or less, or 45% or less may be mentioned.

EXAMPLES

<Quality Evaluation Test of Skim Milk>

To 3.5 g of a sample described in Table 1, 1 ml of a methanol solution of tridecanoic acid (50 μg/ml) as internal standard and 15 ml of acetonitrile were added, they were stirred and centrifuged, thereafter 3.5 ml of a supernatant was recovered, then acetonitrile was removed by a centrifugal evaporator, and the resulting liquid was made to have a constant volume of about 5 ml by using methanol, followed by filtering the liquid through a filter of 0.45 μm. To 5 volumes of this solution, 1 volume of an acetone solution of ADAM (9-Anthryldiazomethane, manufactured by Funakoshi Co., Ltd.) was added, and the resulting mixture was allowed to stand still at room temperature for 90 minutes or more in a dark place and analyzed by high-performance liquid chromatography. As standard substances, 9 substances of butyric acid, caproic acid, caprylic acid, capric acid, lauric acid, myristic acid, palmitic acid, steric acid and oleic acid were used, and the sum total of the amounts of these 9 free fatty acids was regarded as the total amount of free fatty acids. The analysis was carried out under the following conditions.

Analysis Conditions

Column: Unison UK-C8 manufactured by Imtakt

Column temperature: 30° C.

Flow rate: 1.0 ml/min

Mobile phase: Liquid A which was acetonitrile/water=65/35 and liquid B which was acetonitrile/water=85/15 were used, and from 0 to 9 minutes, the liquid A was used in a ratio of 100%, from 9 to 28 minutes, the liquid B was used in a ratio of 0 to 100% in a state of a linear gradient, and from 28 to 46 minutes, the liquid B was used in a ratio of 100%.

Injection volume: 10 μl

Excitation wavelength: 365 nm

Fluorescence wavelength: 412 nm

<Flavor Evaluation Test>

Three experienced sensory evaluation panelists carried out flavor evaluation of samples, and they made absolute evaluation and free description of deliciousness.

Example 1

Raw milk was separated into cream and skim milk by a centrifugal cream separator (manufactured by ELECREM) at a separation temperature of 45° C. The skim milk thus separated was cooled, then heated up to 48° C. and homogenized at a homogenization pressure of 12 MPa. The skim milk thus homogenized was stored at 10° C. or lower for 0 hours, 24 hours and 48 hours and then heated to 80° C. to obtain samples, and the quality of the samples was evaluated.

Comparative Example 1

Raw milk was separated into cream and skim milk by a centrifugal cream separator (manufactured by ELECREM) at a separation temperature of 45° C., the skim milk thus separated was cooled, thereafter the skim milk was stored at 10° C. or lower for 0 hours, 24 hours and 48 hours and then heated to 80° C. to obtain samples, and the quality of the samples was evaluated.

Comparative Example 2

Samples were obtained in the same manner as in Example 1, except that the temperature immediately before the homogenization was changed to 10° C. or lower, and the quality of the samples was evaluated.

The results are shown in Table 1. From Table 1, the total amount of the free fatty acids (total FFA) in the skim milk powder of Example 1 was 0.0303 to 0.0419 mass %. In addition, in Example 1, the amount of the free fatty acids having 14 or more carbon atoms measured after the skim milk was stored for 24 hours after the homogenization treatment was 495% in terms of a content as compared with the amount of the free fatty acids having 12 or less carbon atoms, and the amount increased by 43% as compared with the amount of the free fatty acids having 14 or more carbon atoms measured after the skim milk was stored for 24 hours without carrying out homogenization (Comparative Example 1). Furthermore, as shown in Comparative Example 2, when homogenization treatment was carried out at 10° C. or lower, an increase in the amount of the free fatty acids was not observed.

TABLE 1

| | Homogenization | | Skim milk storage time | HPLC method (in terms of mg/skim milk powder-100 g) | | |
|---|---|---|---|---|---|---|
| | Temperature | Pressure | | 12 or less carbon atoms | 14 or more carbon atoms | Total FFA |
| Comparative Example 1 | No homogenization | | 0 h | 7.7 | 17.8 | 25.4 |
| | | | 24 h | 6.8 | 21.8 | 28.6 |
| | | | 48 h | 6.8 | 21.9 | 28.6 |
| Comparative Example 2 | 10° C. or lower | 12 MPa | 0 h | 6.1 | 20.0 | 26.1 |
| | | | 24 h | 4.7 | 21.7 | 26.4 |
| | | | 48 h | 6.7 | 22.4 | 29.2 |
| Example 1 | 48° C. | 12 MPa | 0 h | 8.6 | 21.6 | 30.3 |
| | | | 24 h | 6.3 | 31.2 | 37.6 |
| | | | 48 h | 9.5 | 32.4 | 41.9 |

Example 2

Samples were obtained in the same manner as in Example 1, except that the cream separation temperature was changed to 48° C. and the homogenization pressure was changed to 24 MPa, and the quality of the samples was evaluated.

Comparative Example 3

Samples were obtained in the same manner as in Comparative Example 1, except that the cream separation temperature was changed to 48° C., and the quality of the samples was evaluated.

Comparative Example 4

Samples were obtained in the same manner as in Comparative Example 2, except that the cream separation temperature was changed to 48° C. and the homogenization pressure was changed to 24 MPa, and the quality of the samples was evaluated.

The results are shown in Table 2. From Table 2, the total amount of the free fatty acids (total FFA) in the skim milk powder of Example 2 was 0.0300 to 0.0431 mass %. In addition, in Example 2, the amount of the free fatty acids having 14 or more carbon atoms measured after the skim milk was stored for 24 hours after the homogenization treatment was 413% in terms of a content as compared with the amount of the free fatty acids having 12 or less carbon atoms, and the amount increased by 46% as compared with the amount of the free fatty acids having 14 or more carbon atoms measured after the skim milk was stored for 24 hours without carrying out homogenization (Comparative Example 3). Furthermore, as shown in Comparative Example 4, when homogenization treatment was carried out at 10° C. or lower, an increase in the amount of the free fatty acids was not observed.

TABLE 2

| | Homogenization | | Skim milk storage | HPLC method (in terms of mg/skim milk powder-100 g) | | |
|---|---|---|---|---|---|---|
| | Temperature | Pressure | time | 12 or less carbon atoms | 14 or more carbon atoms | Total FFA |
| Comparative Example 3 | No homogenization | | 0 h | 7.4 | 18.5 | 25.8 |
| | | | 24 h | 7.2 | 22.6 | 29.8 |
| | | | 48 h | 5.2 | 22.8 | 28.0 |
| Comparative Example 4 | 10° C. or lower | 24 MPa | 0 h | 9.9 | 18.9 | 28.8 |
| | | | 24 h | 8.6 | 21.3 | 29.9 |
| | | | 48 h | 10.1 | 21.5 | 31.6 |
| Example 2 | 48° C. | 24 MPa | 0 h | 7.7 | 22.3 | 30.0 |
| | | | 24 h | 8.0 | 33.0 | 41.0 |
| | | | 48 h | 8.6 | 34.5 | 43.1 |

Example 3

Samples were obtained in the same manner as in Example 1, except that the cream separation temperature was changed to 15° C. and the skim milk was held at 52° C. for 20 minutes after the homogenization and before the storage, and the quality of the samples was evaluated.

Example 4

Samples were obtained in the same manner as in Example 1, except that the cream separation temperature was changed to 15° C. and the skim milk was held at 52° C. for 60 minutes after the homogenization and before the storage, and the quality of the samples was evaluated.

Comparative Example 5

Samples were obtained in the same manner as in Comparative Example 1, except that the cream separation temperature was changed to 15° C., and the quality of the samples was evaluated.

The results are shown in Table 3. From Table 3, the total amount of the free fatty acids (total FFA) in the skim milk powder of Example 3 was 0.102 to 0.117 mass %. In addition, in Example 3, the amount of the free fatty acids having 14 or more carbon atoms measured after the skim milk was stored for 24 hours after the homogenization treatment was 420% in terms of a content as compared with the amount of the free fatty acids having 12 or less carbon atoms, and the amount increased by 105% as compared with the amount of the free fatty acids having 14 or more carbon atoms measured after the skim milk was stored for 24 hours without carrying out homogenization (Comparative Example 5).

Furthermore, from Table 3, the total amount of the free fatty acids (total FFA) in the skim milk powder of Example 4 was 0.095 to 0.104 mass %. In addition, in Example 4, the amount of the free fatty acids having 14 or more carbon atoms measured after the skim milk was stored for 24 hours after the homogenization treatment was 415% in terms of a content as compared with the amount of the free fatty acids having 12 or less carbon atoms, and the amount increased by 81% as compared with the amount of the free fatty acids having 14 or more carbon atoms measured after the skim milk was stored for 24 hours without carrying out homogenization (Comparative Example 5).

TABLE 3

| | Homogenization | | Heating and holding after homogenization | Skim milk storage | HPLC method (in terms of mg/skim milk powder-100 g) | | |
|---|---|---|---|---|---|---|---|
| | Temperature | Pressure | | time | 12 or less carbon atoms | 14 or more carbon atoms | Total FFA |
| Comparative Example 5 | No homogenization | | — | 0 h | 12.6 | 37.9 | 50.4 |
| | | | | 24 h | 13.4 | 44.9 | 58.3 |
| | | | | 48 h | 14.7 | 49.9 | 64.6 |
| Example 3 | 48° C. | 12 MPa | 52° C., 20 min | 0 h | 18.2 | 83.5 | 101.7 |
| | | | | 24 h | 21.9 | 91.9 | 113.9 |
| | | | | 48 h | 23.7 | 93.3 | 117.0 |
| Example 4 | 48° C. | 12 MPa | 52° C., 60 min | 0 h | 16.8 | 77.9 | 94.7 |
| | | | | 24 h | 19.6 | 81.3 | 100.9 |
| | | | | 48 h | 19.0 | 85.1 | 104.1 |

Flavor Evaluation Test

The samples obtained in Example 1 and Comparative Example 1 were each subjected to flavor evaluation.

TABLE 4

| | Homogenization | | Skim milk storage | Result of flavor evaluation | | |
|---|---|---|---|---|---|---|
| | Temperature | Pressure | time | Flavor | Richness | Free description |
| Comparative Example 1 | No homogenization | | 0 h | a | b | fresh and light |
| | | | 24 h | a | b | fresh and light |
| | | | 48 h | a | b | fresh and light |
| Example 1 | 48° C. | 12 MPa | 0 h | a | a | somewhat light and slightly rich |
| | | | 24 h | a | a | rich and somewhat mellow |

TABLE 4-continued

| Homogenization | | Skim milk storage | Result of flavor evaluation | | |
|---|---|---|---|---|---|
| Temperature | Pressure | time | Flavor | Richness | Free description |
| | | 48 h | a | a | rich and somewhat mellow |

* Evaluation criteria for flavor
Whether unpleasant flavor due to free fatty acids having 12 or less carbon atoms is sensed or not.
a: There is no unpleasant flavor, b: There is unpleasant flavor.
* Evaluation criteria for richness
Whether richness due to free fatty acids is sensed or not.
a: Richness is sensed, b: Richness is not sensed so much.

The samples obtained in Examples 1 and 2 were subjected to direct heat sterilization under the retention conditions of 125° C. and 9 seconds using a UHT sterilizer (manufactured by MicroThermics, Inc.), and then cooled to 10° C. or lower. The resulting sterilized skim milk was vacuum concentrated by a centrifugal thin membrane vacuum evaporation apparatus EVAPOR CEP-L Model (manufactured by OKAWARA MFG., CO., LTD.) under the conditions of a vacuum degree of 70 cmHg and an evaporation temperature of about 40° C. until the solid concentration rose up to about 47%. Further, the concentrated skim milk was spray dried by a spray dryer PSD 52 (manufactured by APV) at a hot air temperature of 180° C. while controlling a flow rate of the concentrated skim milk in such a manner that the exhaust air temperature became 85° C., whereby skim milk powder was obtained.

The invention claimed is:

1. A method for producing skim milk powder from skim milk, comprising:

separating a raw milk into a cream component and a skim milk at 10 to 15° C.;

subjecting the skim milk to homogenization treatment under a temperature of 30 to 55° C.;

heating and holding the skim milk subjected to the homogenization treatment at a temperature of 50 to 60° C. for 20 to 60 minutes, initiating cooling immediately after the heating and holding, and storing the skim milk subjected to the homogenization treatment for a period of 12 to 96 hours at a temperature of 10° C. or lower;

after the storing, sterilizing the skim milk at a temperature of 80 to 130° C.; and subsequently drying the skim milk to obtain the skim milk powder, wherein the skim milk powder includes a greater amount of free fatty acids having 14 or more carbon atoms by 20% or more compared to a comparative skim milk powder produced by a method not comprising the homogenization treatment and stored for a period of less than 12 hours.

2. The method according to claim 1, wherein the homogenization treatment is carried out at 43 to 53° C.

3. The method according to claim 1, wherein the homogenization treatment is carried out at a homogenization pressure of 5 to 50 MPa using a homogenizer.

4. The method according to claim 1, wherein the skim milk powder contains a greater amount of free fatty acids as compared to a comparative skim milk powder produced by a method not comprising the homogenization treatment.

5. The method according to claim 1, wherein a percentage of increase of an amount of fatty acids having 12 or less carbon atoms in the skim milk powder as compared to an amount of fatty acids having 12 or less carbon atoms in a comparative skim milk powder produced by a method not comprising the homogenization treatment is lower than a percentage of increase of an amount of fatty acids having 14 or more carbon atoms in the skim milk powder as compared to an amount of fatty acids having 14 or more carbon atoms in the comparative skim milk powder.

6. The method according to claim 1, wherein an amount of free fatty acids having 14 or more carbon atoms in the skim milk powder is 300% or more of an amount of free fatty acids having 12 or less carbon atoms in the skim milk powder.

7. Skim milk powder produced by the method according to claim 1.

8. A method for increasing an amount of free fatty acids in skim milk powder, the method comprising:

separating a raw milk into a cream component and a skim milk at 10 to 15° C.;

subjecting the skim milk to homogenization treatment under a temperature of 30 to 55° C.;

heating and holding the skim milk subjected to the homogenization treatment at a temperature of 50 to 60° C. for 20 to 60 minutes, initiating cooling immediately after the heating and holding, and storing the skim milk subjected to the homogenization treatment for a period of 12 to 96 hours at a temperature of 10° C. or lower;

after the storing, sterilizing the skim milk at a temperature of 80 to 130° C.; and subsequently drying the skim milk to obtain the skim milk powder, wherein the skim milk powder includes a greater amount of free fatty acids having 14 or more carbon atoms by 20% or more as compared to a comparative skim milk powder produced by a method not comprising the homogenization treatment and stored for a period of less than 12 hours.

9. The method according to claim 8, wherein a percentage of increase of an amount of fatty acids having 12 or less carbon atoms in the skim milk powder as compared to an amount of fatty acids having 12 or less carbon atoms in a comparative skim milk powder produced by a method not comprising the homogenization treatment is lower than a percentage of increase of an amount of fatty acids having 14 or more carbon atoms in the skim milk powder as compared to an amount of fatty acids having 14 or more carbon atoms in the comparative skim milk powder.

10. The method according to claim 1, wherein in the storing, the skim milk subjected to the homogenization treatment is stored for a period of 24 to 48 hours.

11. The method according to claim 1, wherein the skim milk has not been subjected to a sterilization treatment to inactivate lipase in the skim milk prior to the homogenization treatment.

12. The method according to claim 1, wherein the skim milk to be subjected to the homogenization treatment comprises lipase.

13. The method according to claim 1, wherein the heating and holding the skim milk is performed at a temperature higher than the temperature used in the homogenization treatment.

14. The method according to claim 1, wherein a total amount of free fatty acids in the skim milk powder is from 0.02 to 0.15 mass %.

15. The method according to claim 1, wherein a total amount of free fatty acids in the skim milk powder is from 0.04 to 0.15 mass %.

16. The method according to claim 1, wherein a total amount of free fatty acids in the skim milk powder is greater than a total amount of free fatty acids in the skim milk.

17. The method according to claim 1, wherein the homogenization treatment is carried out at 45 to 51° C. and a homogenization pressure of 8 to 30 MPa using a homogenizer.

18. The method according to claim 1, wherein the drying comprises vacuum concentrating, spray drying, or both.

19. The method according to claim 8, wherein the heating and holding the skim milk is performed at a temperature higher than the temperature used in the homogenization treatment.

* * * * *